Figure 1:
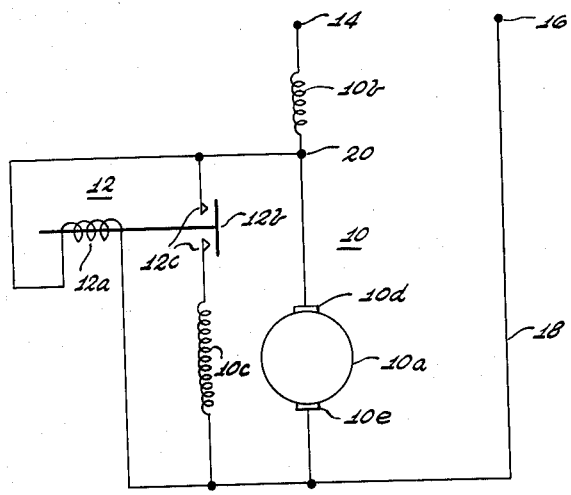

Sept. 21, 1965 V. A. HOOVER 3,207,969
UNIVERSAL MOTOR CIRCUIT
Filed June 8, 1962

INVENTOR.
VAINO A. HOOVER
BY
ATTORNEYS

United States Patent Office 3,207,969
Patented Sept. 21, 1965

3,207,969
UNIVERSAL MOTOR CIRCUIT
Vaino A. Hoover, 2100 S. Stoner Ave.,
Los Angeles, Calif.
Filed June 8, 1962, Ser. No. 200,987
9 Claims. (Cl. 318—245)

My present invention relates generally to electrical motors, and more particularly, to a universal motor circuit.

A universal motor is a machine which will run on either direct or alternating current of the same voltage without having to make any changes of any kind in the machine. Such universal motors are usually small series motors, which have high starting torque and run at fairly high speeds. Small A.C. series motors, such as are built in sizes of about 1/64 H.P., can run at about the same speed on both D.C. and A.C. voltages of the same magnitude. Larger A.C. series motors can also run on direct current. However, for most of these motors to run at the same speed on A.C. and D.C., the D.C. voltage required is lower than the A.C. voltage. The reason for this is that the series field resistance for direct current is less than the series field impedance for alternating current.

As is well known, A.C. and D.C. power are normally supplied at certain standard voltages, for example, 115 volts, 230 volts, etc. In order to vary these available voltages, auxiliary voltage control equipment must be used. Thus, if a larger A.C. series motor, which is rated at a standard alternating voltage, is to be operated on D.C. power, such auxiliary equipment is required in order to reduce the standard direct voltage that is to be applied to the A.C. series motor if it is to run at the same speed in driving a hoist or blower, for example, designed to run at some established speed.

The usual practice has been to reduce the direct voltage applied to a larger A.C. series motor which is operated on D.C. power. This, of course, entails the use of auxiliary control equipment. To avoid the need of auxiliary equipment, it is highly desirable to have a motor which will run equally well on either A.C. or D.C. power of the same voltage. Such a universal motor has the advantage of being able to operate on either A.C. or D.C. power of a standard voltage, as may be available. Since A.C. power is normally supplied in most areas, this advantage is clearly apparent in situations where only D.C. power of a standard voltage is available.

It is an object of my invention to provide a universal motor circuit in which it is not necessary to reduce the direct voltage applied to the circuit for D.C. operation from the alternating voltage that is normally applied to the circuit for A.C. operation.

Another object of this invention is to provide a universal motor circuit which is automatically adapted to operate equally well on either A.C. or D.C. operation.

A further object of my invention is to provide a simple and reliable universal motor circuit which can operate equally well on A.C. and D.C. voltages of the same magnitude.

Figure 2:
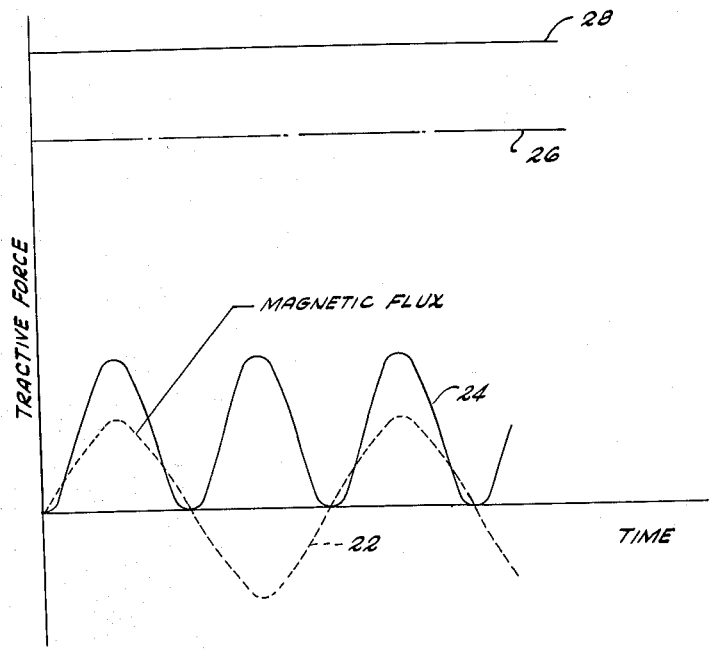

My invention possesses other objects and advantages which, together with the foregoing, will be better understood from the following detailed description taken in conjunction with the accompanying drawing of an illustrative embodiment of my invention, and in which:

FIGURE 1 is a schematic diagram of a circuit of my invention for effecting operation of a motor on either A.C. or D.C. voltages of the same magnitudes; and FIGURE 2 is a graph of waveforms for use in explaining the effects of A.C. and D.C. power on operation of the relay shown in the circuit of FIGURE 1.

Referring to FIGURE 1, my novel motor circuit includes a motor 10 that has an armature 10a, a series field coil 10b, and a shunt field coil 10c. A relay 12, which is a D.C. relay, has its control coil 12a connected across the brush connections 10d, 103 of the armature 10a. The relay 12 has an armature 12b and contacts 12c arranged to constitute a normally open switch controlled by the coil 12a.

As shown, there is provided a pair of terminals 14 and 16, which can be connected to either an A.C. or a D.C. power source. The terminal 14 is connected to the brush 10d of armature 10a through the series field 10b. The terminal 16 is connected to the other brush 10e by a lead 18. One end of the shunt field coil 10c is also connected to the brush 10e, and the other end of the shunt field coil 10c is connected to one of the contacts 12c. The other contact 12c is connected to a junction point 20 between the series field coil 10b and the brush 10d. Thus, the relay 12 when energized is operable to close the armature 12b against the contacts 12c, and thereby connect the shunt field coil 10c across the armature 10a.

The relay 12 is selected to have a control coil 12a which has a relatively high A.C. impedance so that negligible current flows through the coil 12a when the terminals 14 and 16 are connected to a suitable A.C. power source. Thus, for A.C. operation, the relay 12 is not actuated, and the shunt field circuit remains open. Accordingly, the motor 10 is connected and operated as a series motor when the terminals 14 and 16 are connected to an A.C. power source.

The D.C. resistance of the control coil 12a of the relay 12 is low enough to cause the relay to be energized when the terminals 14 and 16 are connected to a suitable D.C. power source. For D.C. operation, sufficient current flows through the control coil 12a to cause it to actuate its armature 12b, thereby closing the contacts 12c and connecting the shunt field coil 12c across the armature 10a of the motor 10. The D.C. resistance of the coil 12a is selected to be low enough, relative to the impedances of the shunt field 10c and armature 10a, such that the relay 12 remains continuously energized on D.C. operation. Thus, the motor 10 is connected and operated as a compound motor when the terminals 14 and 16 are connected to a suitable D.C. power source.

To aid in understanding the above described circuit operation, reference will be made to FIGURE 2 along with FIGURE 1. In FIGURE 2, the broken line waveform 22 illustrates the magnetic flux variations produced in the relay coil 12a when the terminals 14 and 16 are connected to an A.C. power source. The resultant pull or tractive force on the relay armature 12b is indicated by a cyclical waveform 24. The tractive force required for relay pull-in is indicated at a level 26 which is considerably greater than the peak tractive force (curve 24) that results from the alternating current in the relay coil 12a. Consequently, the relay 12 is not actuated when the terminals 14 and 16 are connected to an A.C. power source.

When a D.C. power source is connected to the terminals 14 and 16, the tractive force produced in the relay 12 is indicated at a level 28 that exceeds the lever 26. As can be seen, the tractive force produced in the relay 12 for D.C. operation is greater than the relay pull-in level 26 required for actuation of the relay. Thus, on a D.C. operation, the relay armature 12b is held against the contacts 12c, so that the motor 10 is connected and operated as a compound motor.

As stated previously, when a direct voltage is applied to a larger A.C. series motor, the armature voltage and speed of the motor are higher than when an alternating voltage of the same magnitude is applied thereto. The reason for this is that the series field impedance for alternating current is high, and for direct current, the impedance is low, such that a higher D.C. armature voltage results, which increases speed of the motor. The usual approach in this situation is to reduce the applied voltage when the A.C. series motor is connected to a D.C. power source.

In my universal motor circuit, the motor operates as a series motor on A.C. operation and as a compound motor on D.C. operation. The shunt field coil 10c, when operatively connected with the motor 10, increases the flux in the motor. Since the speed of a D.C. motor is nearly inversely proportional to the flux, the speed of the motor 10, when connected to a D.C. power source, will be lower as a compound motor than as a series motor. Further, the compound motor will have a definite no-load speed which, because of the shunt field, is not excessive.

In view of the foregoing, it will be seen that while I have illustrated and described a particular embodiment of my invention, various modifications may be made therein without departing from the spirit and scope of my invention. Accordingly, I do not intend that my invention be limited, except as by the appended claims.

I claim:

1. A universal motor circuit, comprising: a motor including an armature, series field coil, and shunt field coil, one end of said series field coil being connected in series with said armature in a first series combination for coupling across a power source; and a D.C. actuated relay including a normally open switch coupled in a second series combination with such shunt coil, said second series combination being coupled in parallel with said armature, and a control coil for said relay coupled to said power source and in parallel with said armature for closing said switch to couple said shunt coil in parallel with said armature, when said first series combination is connected across a D.C. power source, whereby said motor operates as a series motor when said first series combination is connected across an A.C. power source, and as a compound motor when said first series combination is connected across a D.C. power source.

2. A universal motor circuit, comprising: a motor including an armature, series field coil and shunt field coil, one end of said series field coil being connected to one side of said armature in a first series combination for coupling across a power source; and a D.C. actuated relay including a control coil and switch means responsively actuated by energization of said control coil, said control coil being coupled across said armature and having a relatively high A.C. impedance and low D.C. impedance to prevent actuation of said switch means when said first series combination is connected to an A.C. power source and permit actuation of said switch means when said first series combination is connected to a D.C. power source, one end of said shunt field coil being connected to one side of said switch means in a second series combination coupled in parallel with said armature whereby said motor operates as a series motor when said first series combination is connected across an A.C. power source, and as a compound motor when said first series combination is connected across a D.C. power source.

3. A universal motor circuit, comprising: a motor including an armature, series field coil and shunt field coil, one end of said series field coil being connected to one side of said armature to form a series combination of said series field coil and said armature which is adapted to be connected across a power source for energization by either A.C. or D.C. power; and means responsive to such energization of said series combination by D.C. power and A.C. power, for respectively coupling and decoupling said shunt field coil in parallel with said armature, whereby said motor operates as a series motor when said series combination is thus energized by A.C. power, and as a compound motor when said series combination is thus energized by D.C. power.

4. Motor means operable on either A.C. or D.C. power as a series or compound motor respectively, comprising: a motor having an armature, a shunt field coil and a series field coil; terminals for connection across a power source; means connecting said series field and armature in series across said terminals; a normally open switch coupled in series combination with said shunt field coil, said series combination being coupled in parallel with said armature; and a control coil in parallel with said armature for closing said switch when D.C. power is applied to said terminals.

5. In a motor having an armature, a shunt field coil and a series field coil, wherein said motor may be operated as a series motor by connecting the series field coil and the armature in series between the terminals of a power source, and wherein said motor may be operated as a compound motor by additionally connecting said shunt field coil in parallel with the armature, means for automatically effecting operation of the motor as a series motor and a compound motor, respectively, when A.C. power and D.C. power are connected to the terminals, comprising: a normally open switch connected in series combination with said shunt field coil said series combination being connected in parallel with said armature; and a control coil coupled to said terminals for actuating said switch to couple said shunt coil in parallel with said armature when D.C. power is connected to said terminals.

6. The combination defined in claim 5, wherein said control coil is connected across said armature.

7. A universal motor circuit, comprising:
a motor, including an armature,
series field coil and shunt field coil,
said series field coil being connected in series with said armature to form a series combination which is adapted to be energized by either D.C. or A.C.;
and means responsive to at least one of such energizations of said series combination in such manner as to maintain connection of said shunt field across said armature while such energization is by D.C. and to maintain disconnection of said shunt field from across said armature while such energization is by A.C.,
whereby said motor operates as a series motor while said series combination is energized by A.C., and as a compound motor while said series combination is energized by D.C.

8. In a universal motor circuit, including a motor having an armature, a shunt field coil and a series field coil, said motor being adapted to be operated as a series motor by connecting the series field coil and the armature in series between terminals which are adapted to be connected to a power source, and as a compound motor by additionally connecting the shunt field coil across the armature, means for automatically effecting operation of the motor as a series motor and a compound motor respectively, when A.C. and D.C. are connected to said terminals comprising:
switch means connected in series with the shunt field coil across said armature;
and control means for actuating said switch means, said control means being connected to said terminals and thereby adapted to be energized by A.C. or D.C., said control means including means responsive to such energization for actuating said switch such that the said switch is maintained in closed condition when said control means is thus energized by D.C. and maintained in open condition when thus energized by A.C.

9. A universal motor circuit, comprising:
the motor including an armature;
a series field coil and a shunt field coil;
said series field coil being connected in series with said armature to form a series combination which is adapted to be energized by either A.C. or D.C.;

and means effective when said series combination is energized by D.C. and A.C. respectively to maintain said shunt field coil connected across, and to maintain said shunt field coil disconnected from across said armature, whereby said motor operates as a series motor when said series combination is energized by A.C., and as a compound motor when said series combination is energized by D.C.

References Cited by the Examiner

UNITED STATES PATENTS

| | | | |
|---|---|---|---|
| 1,244,511 | 10/17 | Lamme | 318—245 |
| 1,829,872 | 11/31 | Oswald | 318—245 X |
| 2,376,522 | 5/45 | Storm | 318—245 |
| 2,754,462 | 7/56 | Hochhausler | 318—441 |

JOHN F. COUCH, *Primary Examiner.*

ORIS L. RADER, *Examiner.*